US011379214B2

(12) United States Patent
Nachimuthu et al.

(10) Patent No.: US 11,379,214 B2
(45) Date of Patent: Jul. 5, 2022

(54) RUNTIME FIRMWARE ACTIVATION FOR MEMORY DEVICES

(71) Applicant: Intel Corporation, Santa Clara, CA (US)

(72) Inventors: Murugasamy K. Nachimuthu, Beaverton, OR (US); Mohan J. Kumar, Aloha, OR (US); Shamanna M. Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 16/369,161

(22) Filed: Mar. 29, 2019

(65) Prior Publication Data

US 2019/0243637 A1  Aug. 8, 2019

(51) Int. Cl.
*G06F 9/44* (2018.01)
*G06F 8/656* (2018.01)
*G06F 8/654* (2018.01)
*G06F 3/06* (2006.01)
*G06F 9/4401* (2018.01)

(52) U.S. Cl.
CPC ............ *G06F 8/656* (2018.02); *G06F 3/0614* (2013.01); *G06F 3/0632* (2013.01); *G06F 3/0673* (2013.01); *G06F 8/654* (2018.02); *G06F 9/4401* (2013.01)

(58) Field of Classification Search
CPC ....................................................... G06F 8/656
USPC ........................................................ 717/169
See application file for complete search history.

(56) References Cited

U.S. PATENT DOCUMENTS

| 10,152,264 | B1* | 12/2018 | Butcher ............... G06F 3/0646 |
| 11,069,309 | B2* | 7/2021 | Sultenfuss ........... G09G 3/3406 |
| 2012/0124357 | A1* | 5/2012 | Zimmer .................. G06F 8/61 713/2 |
| 2018/0165101 | A1* | 6/2018 | Bulusu ............... G06F 11/1417 |
| 2020/0104504 | A1* | 4/2020 | Chaiken ............... G06F 21/572 |
| 2020/0341744 | A1* | 10/2020 | Suryanarayana ... G06F 13/1668 |

OTHER PUBLICATIONS

Extended European Search Report for Patent Application No. 20 158 894.4-1224, dated Dec. 4, 2020, 10 pages.

* cited by examiner

*Primary Examiner* — Evral E Bodden
(74) *Attorney, Agent, or Firm* — Compass IP Law PC

(57) ABSTRACT

An interface is provided to update a firmware of a persistent memory module at runtime without restarting an operating system on the platform. The operating system initiates the firmware update by triggering a sleep state or by entering a soft reboot. The interface is capable of preserving the state of the platform for all memory modes that support volatile memory regions, persistent memory regions, or both, and reducing or eliminating the demand for access to memory during the firmware update. The persistent memory module is capable of updating the firmware responsive to a platform instruction generated using the interface, including preserving operational states for memory devices in all memory regions, including memory devices in volatile and persistent memory regions.

20 Claims, 13 Drawing Sheets

800 – EXAMPLE FIELDS OF A RUNTIME FIRMWARE ACTIVATION ACPI TABLE

| Field | Description |
|---|---|
| 802 RFAI Platform Capability | Indicates whether platform supports runtime firmware activation |
| 804 RFAI Communication Channel Identifier | Identifies Platform Communication Channel for runtime firmware activation (valid only when platform is capable of supporting runtime firmware activation |
| 806 RFA Command | PCC Command field to specify command codes used by RFAI Platform Communication Channel, e.g. 0x01 Execute RFAI command |
| 808 Select RFA Capability | Select the capability |
| 810 Get RFA Status | Status:<br>0000b – Success<br>0001b – Busy<br>0010b – Aborted<br>0011b – Activation failed on one or more devices<br>0100b – No new FW to activate<br>...<br>Nnnnb – etc. |
| 812 Parameter Blocks | Parameter Block Structure for RFAI |
| 812a RFA Command (INPUT) | 0x01 START_RF_ACTIVATION<br>0x02 GET_RF_ACTIVATION_STATUS |
| 812b RFA Command Status (OUTPUT) | Get capability specific status details |

FIG. 8

900 – EXAMPLE RUNTIME FIRMWARE ACTIVATION
UEFI NVRAM VARIABLE DEFINITION

```
#define RUNTIME_FIRMWARE_ACTIVATION_VARIABLE_GUID
{0x974e650c, 0x05fc, 0x4765, 0x82, 0x6b, 0x21, 0x9a, 0x26,
0xd4, 0x1e, 0x48}
Typedef struct {
    UINT64 RuntimeFirmwareActivationCapability; // read
  only
    UINT64 RuntimeFirmwareActivationRequest;
    UINT64 RuntimeFirmwareActivationStatus; // read only
   } RUNTIME_FIRMWARE_ACTIVATION_VARIABLE;

Struct {
 UINT64 PlatformBIOS:1;
 UINT64 PersistentMemoryFW:1;
 UINT64 Reserved:62;
} RFACapability;

Struct {
 UINT64 PlatformBIOS:1;
 UINT64 PersistentMemoryFW:1;
 UINT64 Reserved:62;
} RFARequest:

enum {
 Success;
 Busy;
 Aborted;
 Activation_failed;
 No_new_FW_to_activate;
} RFAStatus:
```

RUNTIME FIRMWARE ACTIVATION FOR MEMORY DEVICES

FIELD

The descriptions are generally related to memory, and more particularly to updating firmware of a memory device.

BACKGROUND

Modern memory devices are equipped with built-in firmware and hardware logic to provide various features, such as checking data integrity, memory device health status, ensuring security and performance enhancement. Periodically, storage vendors of storage systems deploy new firmware for memory devices to address security issues, fix performance issues and bugs, identify the root cause of problems or to add additional features.

To activate new firmware for a memory device a system reboot of the storage system is typically required. A system reboot impacts storage services that must be shut down and restarted or migrated to another storage system.

BRIEF DESCRIPTION OF THE DRAWINGS

In the description that follows, examples may include subject matter such as a method, a process, a means for performing acts of the method or process, an apparatus, a memory device, a system, and at least one machine-readable tangible storage medium including instructions that, when performed by a machine or processor, cause the machine or processor to performs acts of the method or process according to described embodiments illustrated by way of example and not limitation in the figures of the accompanying drawings, in which like references indicate similar elements and in which:

FIG. 8 is a table illustrating example fields of an ACPI (Advanced Configuration and Power Interface) table for providing kernel soft reboot based runtime firmware activation for memory devices in accordance with various examples described herein;

FIG. 9 is a definition of example UEFI (Unified Extensible Firmware Interface) variables for providing sleep state based runtime firmware activation for memory devices in accordance with various examples described herein;

Figure 1:
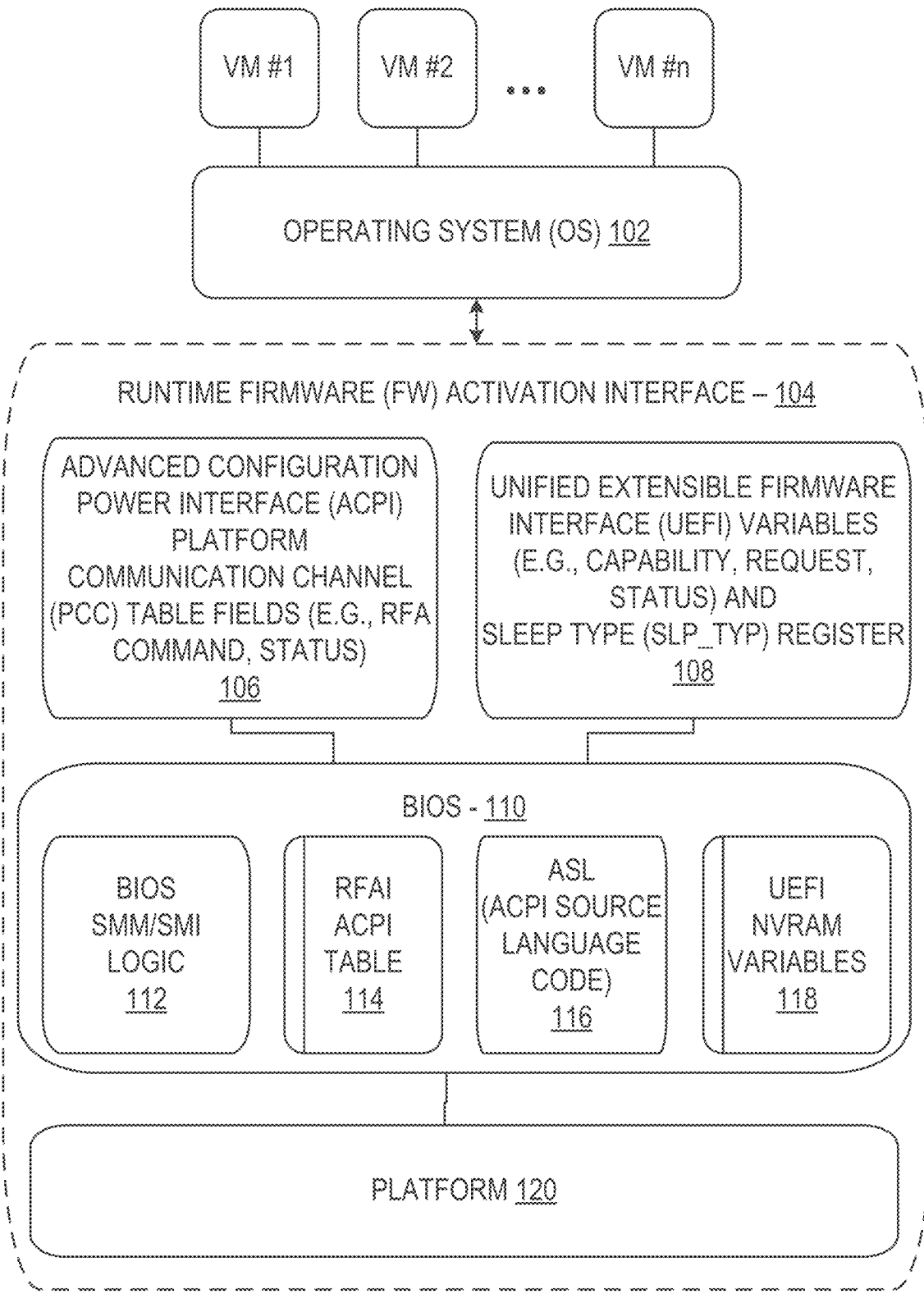
FIG. 1 is a schematic block diagram of a system for providing runtime firmware activation for memory devices in accordance with various examples described herein.

Other features of the described embodiments will be apparent from the accompanying drawings and from the detailed description that follows.

DETAILED DESCRIPTION

Because modern storage systems in today's data centers support a cloud operating environment that requires high data availability, a system reboot to update firmware of memory devices can be time consuming and require redundant hardware or software. In some cases, data center services affected by a system reboot cannot be migrated resulting in an interruption in service. For this reason, cloud service providers are often unable to meet their service level agreements during the firmware upgrade process.

Demand for persistent memory enabled computer systems is growing for other types of users besides cloud service providers. For example, persistent memory solutions are crucial for three-dimensional cross-point (3D XP) memory systems used in various end user applications, such as competitive video gaming, booting from persistent memory and "instant on" applications. Updating persistent memory module firmware could result in an interruption to end user applications. File system corruption or significant data loss from a system reboot could jeopardize persistent memory solutions for end user products.

To address the challenge of upgrading firmware in memory devices without jeopardizing a cloud service provider's ability to meet their service level agreements and other end user applications relying on persistent memory, a runtime firmware activation (RFA) interface enables new firmware for a memory device to be activated without requiring an operating system reboot. In one embodiment, an image of the firmware is saved on the memory device and activation is triggered during any of an operating system (OS) sleep state and an OS soft reboot. The OS includes system software for managing a platform of a computer system that is capable of entering a sleep state or commencing a soft reboot of a kernel of the OS without shutting down the entire platform. Examples include the Microsoft Windows operating systems of the Microsoft Corporation and the Linux operating system.

In one embodiment, the memory device that can be activated without requiring a system reboot is any device capable of being reset within a short period of time provided by the RFA interface during any of the OS sleep state and the OS soft reboot. One example of a memory device that can be reset within a short period of time and activated without requiring a system reboot in accordance with the examples described herein is a non-volatile dual inline memory module (NVDIMM), also referred to as a persistent memory module. Different types of memory modules that can be activated without requiring a system reboot using the RFA interface described herein can include a crosspoint memory module (e.g., the Intel® Optane™ 3D Xpoint Dual inline memory module, 3D XP DIMM) and other types of non-volatile DIMMs (NVDIMMs), such as an NVDIMM-F with flash storage, an NVDIMM-N with both flash storage and traditional DRAM, and an NVDIMM-P with persistent DRAM and access to external flash for caching. In the description that follows, the different memory modules that can be activated without requiring a system reboot using the RFA interface described herein are collectively referred to as persistent memory modules.

In one embodiment, the RFA interface enables new firmware for a persistent memory module to be activated during the OS sleep state while the OS and the input/output (I/O) devices stop using the memory.

In one embodiment the RFA interface enables new firmware for a persistent memory module to be activated during the soft reboot based runtime firmware activation depending on an operational mode of the memory. For example, the operational mode of the memory will impact whether to allow direct memory access (DMA) during the soft reboot based runtime firmware activation. In one embodiment, the RFA interface enables the new firmware to be successfully activated without requiring a system reboot regardless of the operational mode of the memory. Robust support for runtime firmware activation for all operational modes of the memory is important since most persistent memory modules being updated are capable of operating in different modes to support both volatile and persistent regions in memory.

In one embodiment, if it is determined that DMA cannot be allowed during runtime firmware activation, then the RFA interface enables new firmware to be activated during soft reboot in a manner similar to runtime firmware activation during the OS sleep state. In one embodiment, if it is determined that DMA can be allowed during runtime firmware activation, then the RFA interface considers the operational memory modes to determine whether to quiesce only some or all regions of memory during the soft reboot based runtime firmware activation.

In one embodiment, both the OS sleep state and OS soft reboot based implementations of the RFA interface enable preservation and restoration of the state of any virtual machines (VM), user and system processes and other volatile data to avoid any disruption that would otherwise be caused during the new firmware activation.

In one embodiment, the RFA interface takes advantage of a memory device's ability to perform a reset within a short period of time and activating new firmware while the memory controller pends the traffic going to the memory device.

FIG. 1 is a schematic block diagram of a system 100 for providing runtime firmware activation for memory devices in accordance with various examples described herein. An operating system (OS) 102 operates multiple virtual machines (VM), including VM1, VM2, . . . VMn. The platform 120 on which the OS 102 operates includes a BIOS 110 that, among other runtime services, exposes a runtime firmware activation (RFA) interface 104 to the OS 102 to initiate the RFA activation process on a memory device.

For example, in one embodiment, by publishing values to one or more fields defined in the platform communication channel (PCC) ACPI 106 of BIOS 110, including fields for an RFA command and an RFA status, the OS 102 can initiate an RFA activation process for memory devices (not shown) during a soft reboot, such as a reboot of the kernel of the Windows OS, also referred to as a "kernel soft reboot" (KSR), or a reboot of the kernel of the Linux operating system, referred to as "kernel execution" (kexec), collectively referred to herein as simply a "soft reboot."

As another example, in one embodiment, the BIOS 110 exposes the RFA interface 104 to the OS 102 through one or more variables defined in the platform UEFI and sleep type register (e.g. SLP_TYP) 108. The OS 102 can set the UEFI variables and write to the sleep type register to initiate the RFA activation process for memory devices during a sleep state.

In one embodiment, the components of the BIOS 110 used to expose the RFA interface 104 to the OS 102 include the BIOS system management mode (SMM) and system management interrupt (SMI) logic 112, the aforementioned fields of the ACPI in ACPI table 114 used to publish the ACPI fields to the PCC 106 in preparation for activating firmware during a soft reboot and the ACPI source language code (ASL) 116 to provide additional interfaces for memory module. The components of the BIOS 110 used to expose the RFA interface 104 to the OS 102 further include the UEFI non-volatile random access memory (NVRAM) variables 118 for activating firmware during a sleep state.

Figure 2A:
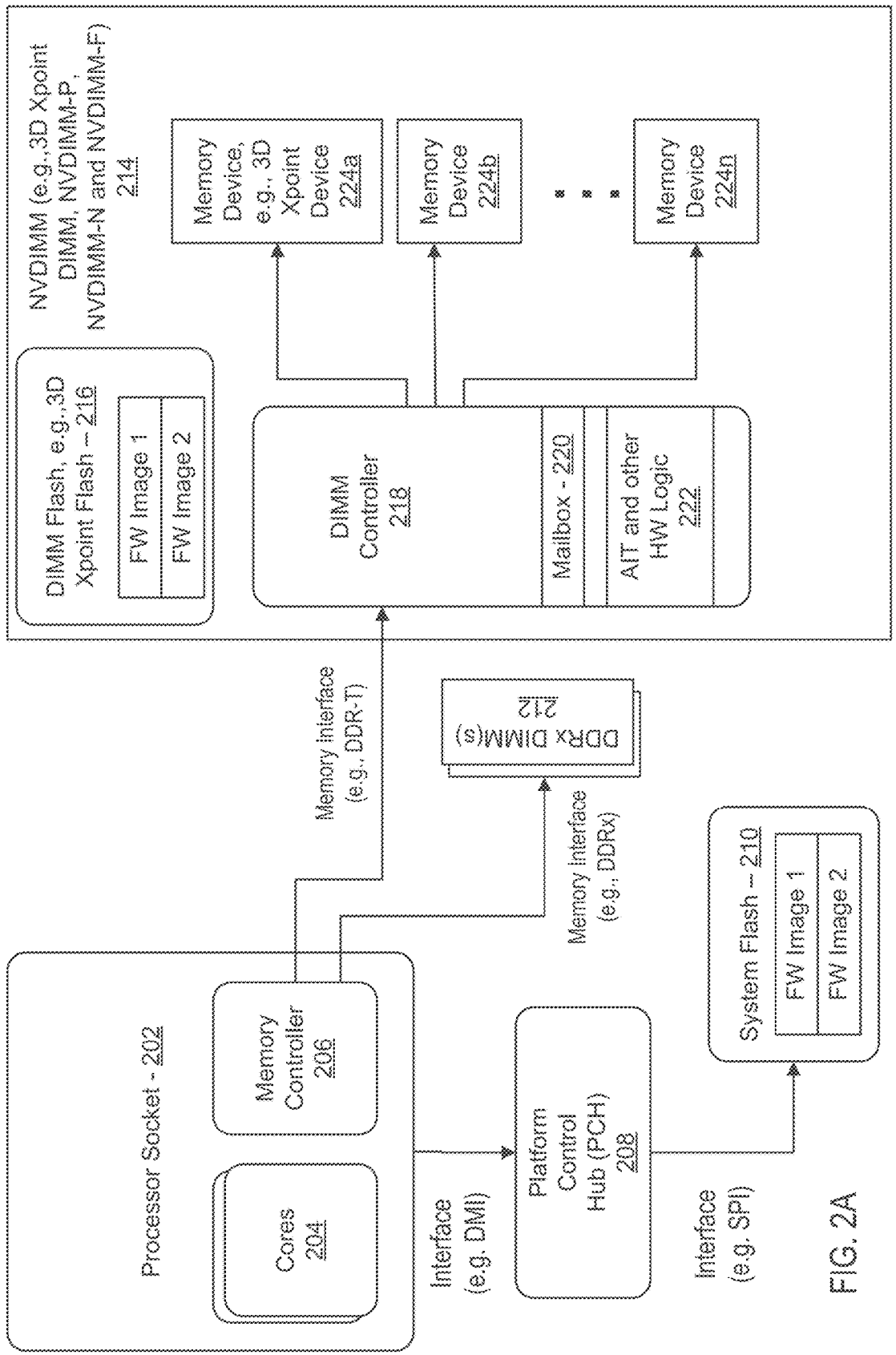
FIGS. 2A-2B are schematic block diagrams of further details of the components of a system for providing runtime firmware activation for memory devices in accordance with various examples described herein.
Figure 2B:
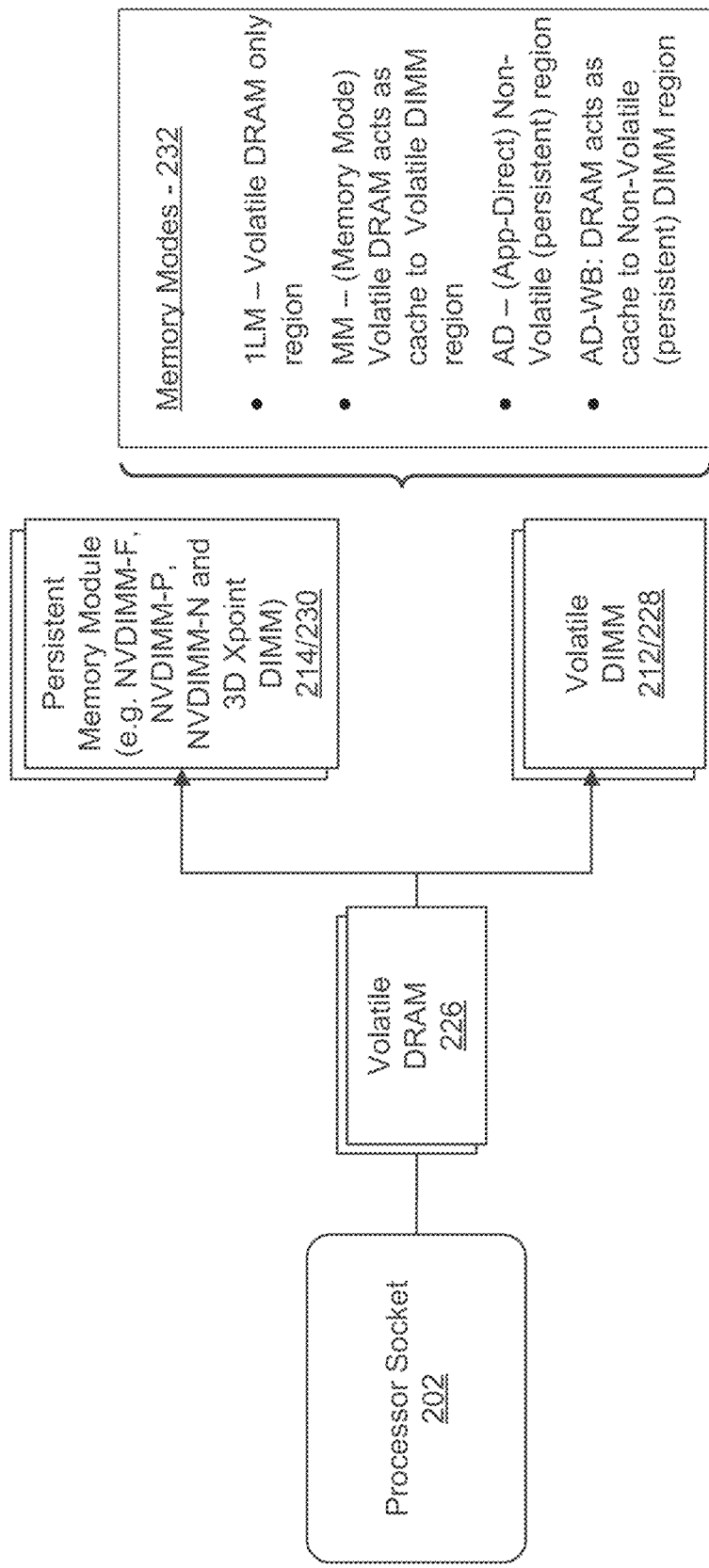

FIGS. 2A-2B are schematic block diagrams of further details of the components of a system for providing runtime firmware activation for memory devices in accordance with various examples described herein. In RFA memory component overview 200A, a processor socket 202 for a processor, including a host processor, central processing unit (CPU), microcontroller or microprocessor, graphics processor, peripheral processor, application specific processor, or another type of processor, can be single core or multicore. A memory controller 206 is coupled to one or more persistent memory modules containing memory devices. By way of example only and not limitation, the one or more persistent memory modules include DDRx (Double Data Rate) DIMMs (dual in-line memory modules) 212 coupled to the memory controller via a memory interface, and one or more persistent memory modules 214 also coupled to the memory controller via a memory interface. The memory interface to the DDRx DIMMs 212 can be any compatible DDRx memory interface depending on the version of the DDRx DIMM, e.g. DDR3, DDR4, DDR5. The memory interface to the persistent memory modules 214 can be any compatible interface, such as the DDR-T, Compute Express Link (CXL), Cache Coherent Interconnect for Accelerators (CCIX) and Gen-Z memory interfaces.

In one embodiment, the processor socket 202 is coupled to a platform control hub (PCH) 208 via an interface such as a DMI (Direct Media Interface), and the PCH 208 is in turn coupled to a system flash 210 for storing one or more firmware images, FW Image 1 and FW Image 2, via another interface, such as an SPI (Serial Peripheral Interface).

In one embodiment, the persistent memory module 214 is a 3D XP DIMM that includes 3D Xpoint Flash memory 216 in which to store new firmware as firmware images, FW Image 1, FW Image 2. Other types of persistent memory modules can be used, including NVDIMM-F, NVDIMM-P and NVDIMM-N types of persistent memory modules. The persistent memory module 214 includes a DIMM controller 218 to control multiple memory devices 224a, 224b, . . . 224n. During activation the persistent memory module 214 contains hardware ROM (read only memory) blocks that are executed initially, after which the DIMM controller 218 firmware is loaded to internal memory and executed. The DIMM controller 218, in combination with a hardware-provided mailbox register 220, enable the BIOS and OS to update the current firmware in the DIMM controller 218 with a new firmware from the one or more firmware images, FW Image 1, FW Image 2, stored in the DIMM flash memory 216. The mailbox register 220 is typically a shared memory area referred to as a mailbox because a firmware reserves the area for receiving messages from the BIOS and OS, such as a start message, or in this case a reset message to activate new firmware.

During a power on of the persistent memory module 214, the DIMM controller 218 stores the addresses of the memory devices 224a, 224b, 224n in an Address Indirection Table (AIT) Over time, as the memory devices 224a, 224b, 224n are accessed, especially when they are written to, the devices degrade and the voltage applied to them may need to be increased to reduce the error rate. For this reason, all of the memory devices 224a, 224b, 224n are wear-leveled to keep them in a certain wear-level band. The wear-level information and AIT are saved during a persistent memory module 214 power down or reset. Thus, in one embodiment, the wear-level information and AIT are also preserved during RFA firmware activation.

During a conventional firmware update, a new firmware image such as FW Image 1, FW Image 2 in the DIMM flash memory 216 is not immediately applied to the persistent memory module 214. Rather, the firmware takes effect only after the persistent memory module 214 is reset. If the persistent memory module 214 is reset while the OS (102, FIG. 1) is attempting to access or currently accessing the persistent memory module 214, the application would fail due to the unavailability of the access and the OS 102 would shut down. For this reason, during a conventional firmware update, the OS 102 is required to shut down and reboot in order for the new firmware to take effect. Because virtual machines/applications rely on the OS 102 to function, the OS shut down takes the virtual machines/applications down as well.

To address this problem, in one embodiment the RFA interface 104 allows cloud service providers to continue to provide services during a firmware update by reducing the total time required to handle the firmware update to within a small window of time, typically on the order of less than 10 seconds. This small window of time can allow any service timeouts that do occur to be hidden behind a network TCP/IP timeout.

Another challenge to updating firmware for memory devices is that some cloud service providers enable Direct Device Assignment (DDA) to their virtual machines. DDA allows user space code to initiate DMA (direct memory access) to memory regions that cannot be easily migrated to other systems during a firmware update. To address this challenge, in one embodiment the RFA interface 104 operates to reduce bandwidth to memory during the total period of time for runtime firmware activation to complete, but limits quiescing of all traffic to only a smaller period of time within the total period of time that the hardware would allow. In so doing, the RFA interface 104 can activate new firmware for all memory regions without impacting DMA In one embodiment, as a backstop, if a power loss occurs during a new firmware activation period, the new firmware can be activated on the next reboot—in other words the RFA interface 104 can return a fail status to delay the firmware update to the next reboot. Likewise, if an error occurs during runtime firmware activation, the RFA interface 104 can operate to roll back the firmware to a previous version. For this reason, the platform 208 (and 120, FIG. 1) and the persistent memory module 214 include sufficient flash memory 210, 216 to store multiple images of firmware, FW Image 1, FW Image 2, yet to be activated.

In one embodiment, as another precaution to guard against timeouts during the runtime firmware activation period, the RFA interface 104 operates to limit control plane function access to the memory devices 224a, 224b, 224n and includes a busy status for the control plane functions that take longer to initialize (as further described with reference to FIG. 7).

To achieve the performance and responsiveness in a persistent memory enabled system, a significant amount of volatile cache with high bandwidth capability along with the non-volatile persistent memory is typically required. For example, a typical persistent memory solution includes a minimum of 8 GB of volatile memory cache. With reference to FIG. 2B, a typical partitioning of memory into volatile regions, such as volatile DRAM 226 and volatile DIMM 212/228, and non-volatile, or persistent regions, such as persistent memory modules and different types of NVDIMMs and 3D Xpoint DIMMs 214/230 give rise to a system that can operate in different memory modes 232. As illustrated in FIG. 2B, the different memory modes 232 include a 1LM mode for volatile DRAM-only regions, MM (memory mode) for volatile DRAM acting as a cache to a volatile DIMM region, an AD (App-Direct) non-volatile, or persistent region, and an AD-WB (App-Direct-Write-Back) region in which DRAM acts as cache to a persistent DIMM region. In order to successfully perform a runtime firmware activation for memory devices partitioned into volatile and persistent regions, the RFA interface 104 takes the memory mode into account when initiating a runtime firmware activation process during a kernel soft reboot (as described further with reference to FIG. 7).

Figure 3A:
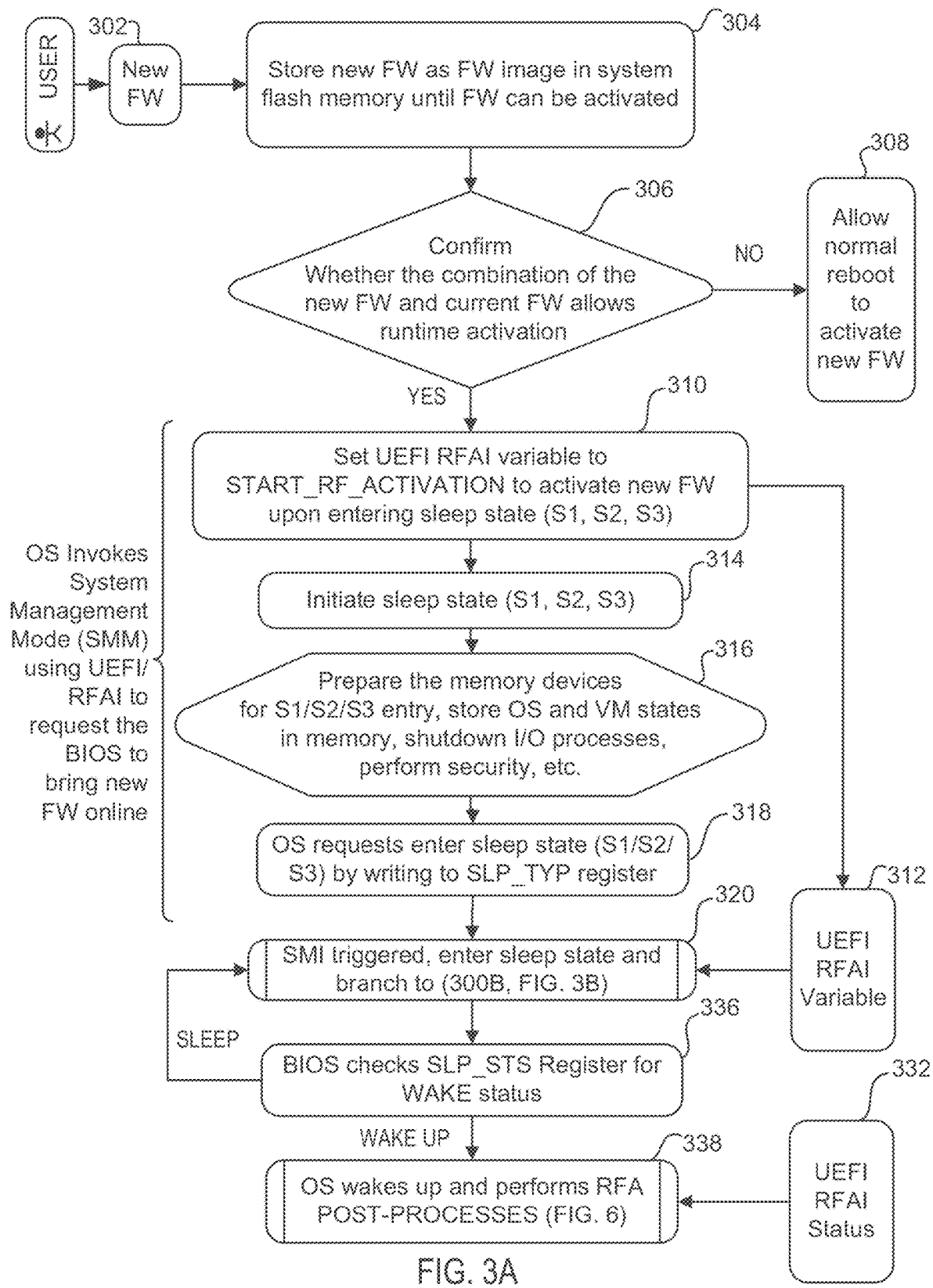
FIGS. 3A-3B are flow diagrams of a process flow for providing sleep state based runtime firmware activation for memory devices in accordance with various examples described herein.
Figure 3B:
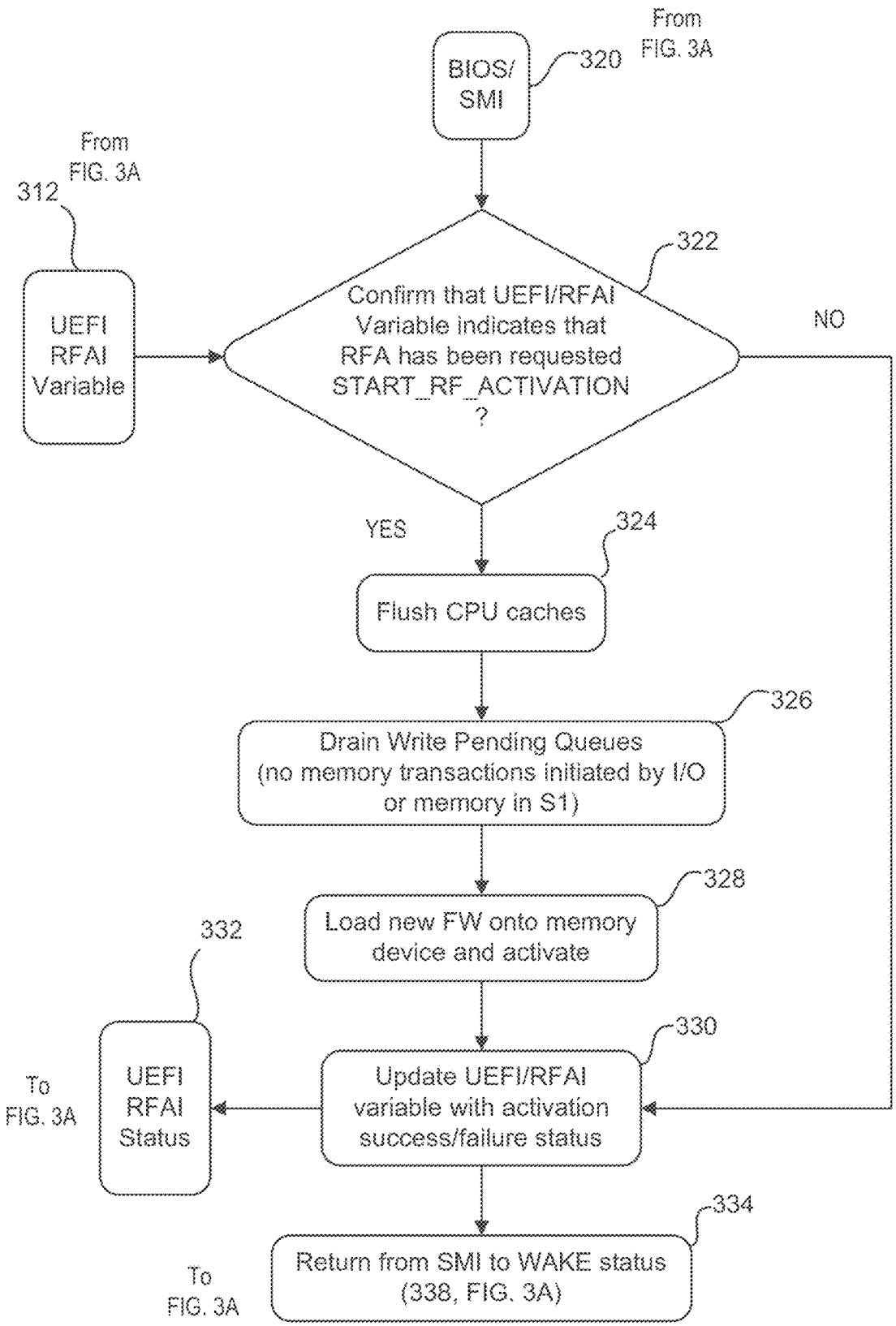

FIGS. 3A-3B are flow diagrams of a process flow for providing sleep state based runtime firmware activation for memory devices in accordance with various examples described herein. A process 300A begins at 304 with a new firmware (FW) 302 stored as a FW image in system flash memory until the new FW can be activated. At 306, the process 300A confirms whether the combination of the new FW and current FW (in the memory controller) allows runtime activation. If not, at 308 the process 300A ends to allow a normal reboot to activate the new FW. If so, at 310 the process 300A continues, setting a UEFI variable 312 for the RFA interface to START_RF_ACTIVATION to activate the new FW upon initiating a sleep state (S1, S2, S3) 314. In addition, the process 300A prepares the memory devices for S1/S2/S3 entry, including storing the OS and VM states in memory, shutting down I/O and user processes and performing security 316. Finally, at 318, the OS requests entry into the sleep state S1/S2/S3 by writing to the SLP_TYP register. The SLP_TYP register triggers a service management interrupt SMI in the BIOS SMM logic that causes the OS to enter the sleep state 320.

In one embodiment, with reference to FIG. 3B, upon entering the sleep state, a process 300B confirms that the UEFI variable 312 (set at 310) indicates that an RFA has been requested. The UEFI variable functions as a qualifier to alter the normal sleep state processes that would otherwise occur. For example, if the UEFI variable 312 has been set, the process 300B continues, first to flush CPU caches 324 and then to drain write pending queues 326 (no additional memory transactions are initiated by I/O or memory while the OS is in sleep state S1). In one embodiment, the process 300B invokes asynchronous DRAM refresh to flush the memory write pending queues. Other techniques to reduce the memory bandwidth can also be employed. At 328 the process 300B loads the new firmware in the persistent memory module in place of the current firmware. At 330, the process 300B concludes by updating the UEFI variable with an activation success or failure status 332, as needed, and returns control from the triggered SMI sleep state to the WAKE state. With reference again to FIG. 3A, in the WAKE state, control returns to the BIOS, whereupon the OS wakes up at 338 and performs any RFA post-processes as needed (described with reference to FIG. 6).

Figure 4A:
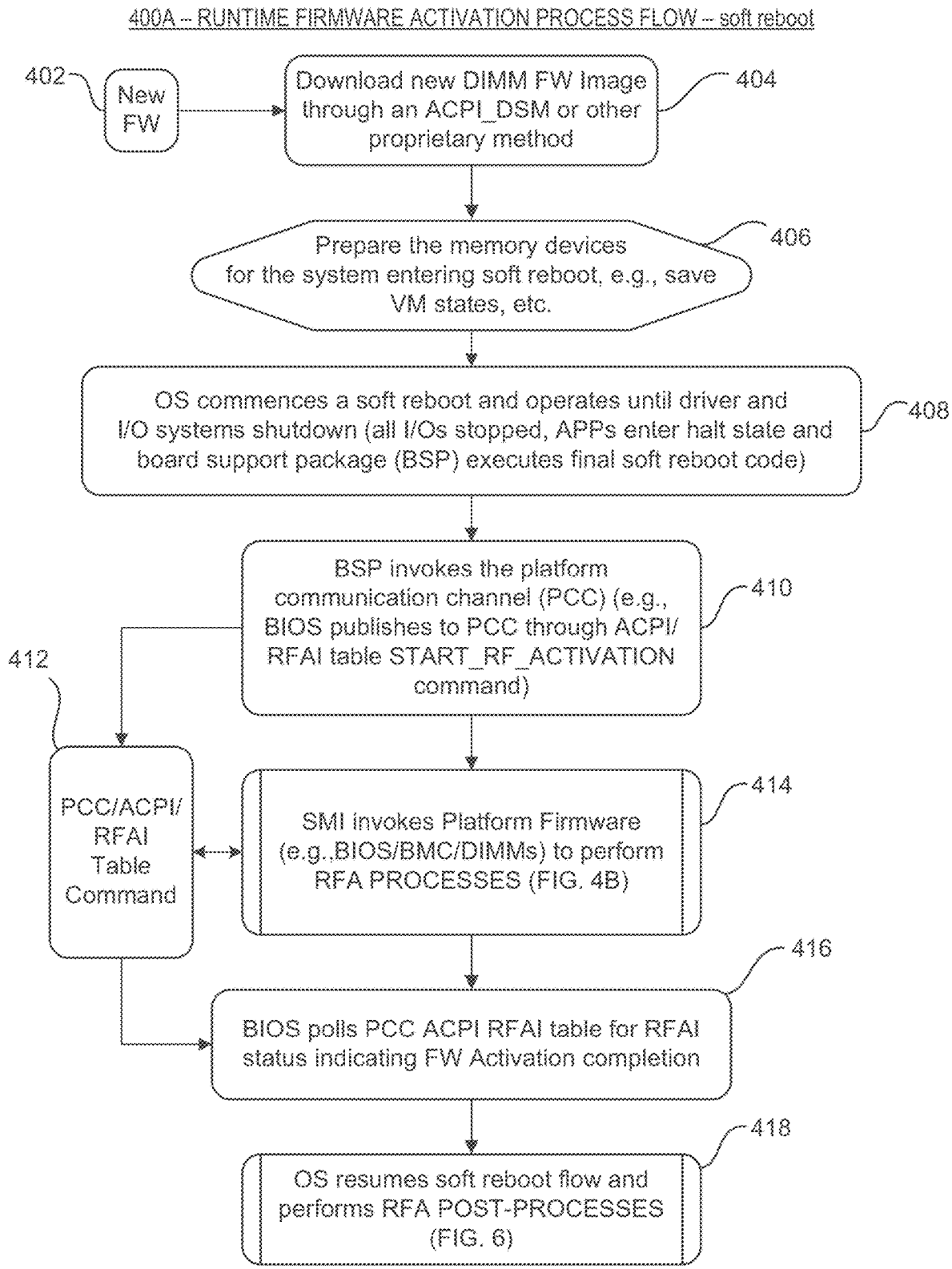
FIGS. 4A-4B are flow diagrams of a process flow for providing kernel soft reboot based runtime firmware activation for memory devices in accordance with various examples described herein.
Figure 4B:
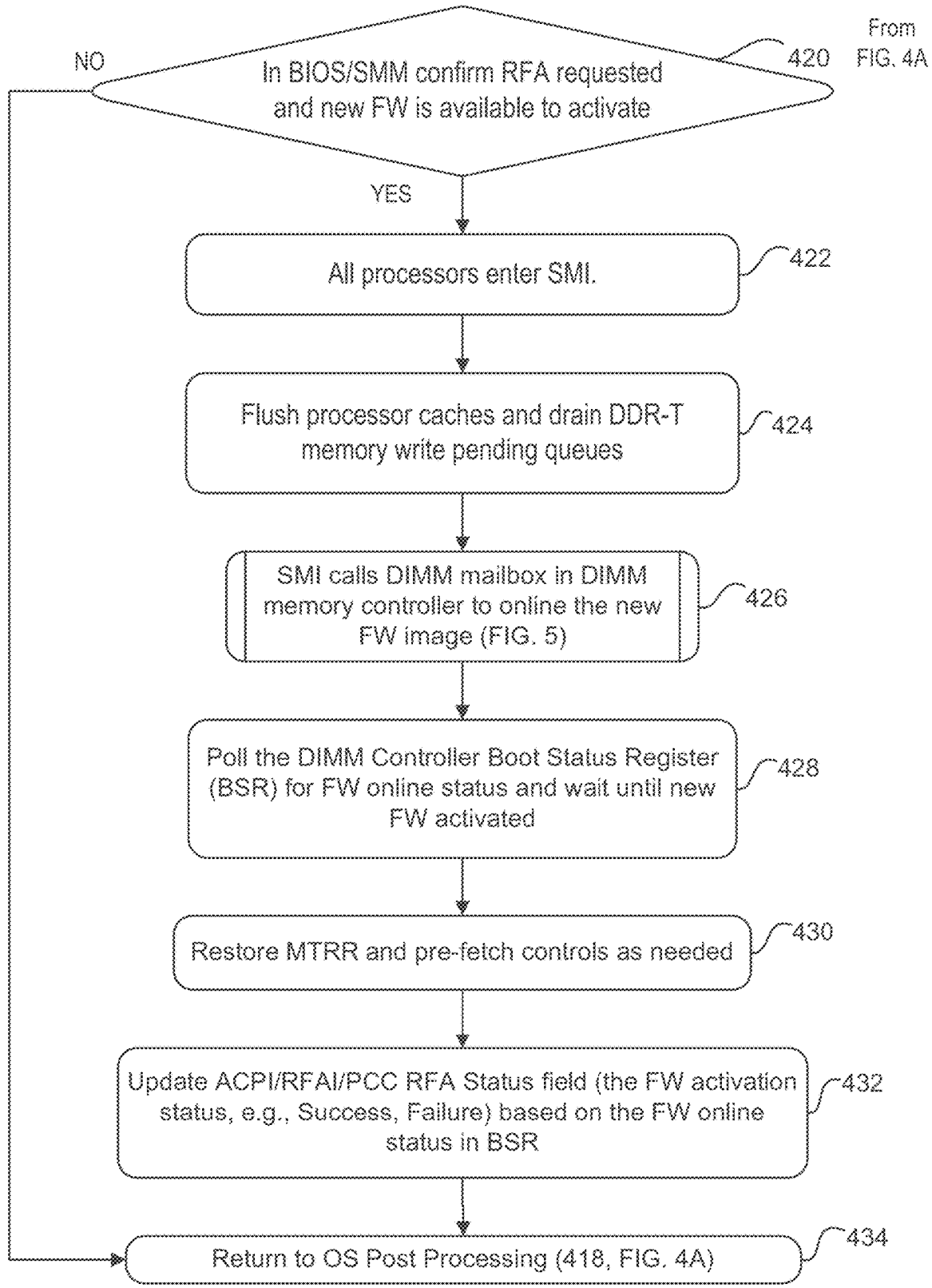

FIGS. 4A-4B are flow diagrams of a process flow for providing kernel soft reboot based runtime firmware activation for memory devices in accordance with various examples described herein. Process 400A begins with the receipt of a new firmware 402 downloaded and stored 404 in a memory module's flash memory as a new firmware image. In one embodiment, the new firmware image is stored in the memory module's flash memory using an ACPI device specific method or other proprietary method for storing the firmware. At 406, the process 400A prepares the OS for entering a kernel soft reboot, including saving any virtual machine states. At 408, the OS enters the kernel soft reboot logic and operates until the various driver and input/output systems shutdown. For example, operation continues until all input/output has stopped, applications have entered the halt state and the board support package executes the final kernel soft reboot code. At 410, the board support package invokes the platform communication channel to begin the runtime firmware activation by publishing a START_RF_ACTIVATION command to a field in an RFA interface table created in the ACPI. At 414 the process 400A generates an SMI to initiate the runtime firmware update. At 416 the BIOS polls the platform communication channel's ACPI table to monitor the RFA status indicating whether the runtime firmware activation has completed. Upon determining that the runtime firmware activation has, in fact, completed, the OS resumes the kernel soft reboot process and performs any post-processes to restore the platform to normal operation (described with reference to FIG. 6).

With reference to FIG. 4B, once the SMI is generated to initiate the runtime firmware update, the process 400A continues as process 400B at 420, where the BIOS, now in system management mode, confirms that the RFA interface requested a firmware activation and that a new firmware is, in fact, available to activate. Once confirmed, the process 400B continues at 422 to cause all processors to enter an SMI and commence flushing their caches and draining any memory write pending queues.

In one embodiment, at 426, the process 400B continues, initiating a call to the persistent memory module mailbox in the persistent memory controller to begin the process of activating the new firmware image. At 428, the process 400B awaits the outcome of the process of activating the new firmware image, including polling the persistent memory module's controller boot status register to determine the success or failure of the runtime firmware activation. At 430, once the runtime firmware activation is determined to be complete, the process 400B commences restoring the memory type range registers (MTRR) and any pre-fetch controls as needed. The process 400B continues at 432 to update an RFA status field stored in the ACPI table of the platform communication channel, such as the status indicating whether the runtime firmware activation was a success or a failure, based on the firmware online status published in the boot status register by the persistent memory module. Lastly, the process 400B concludes and returns control to the OS to carry out any post-processing needed to return the storage system to a fully functional state (see FIG. 6 for a description of the post-processing).

Figure 5:
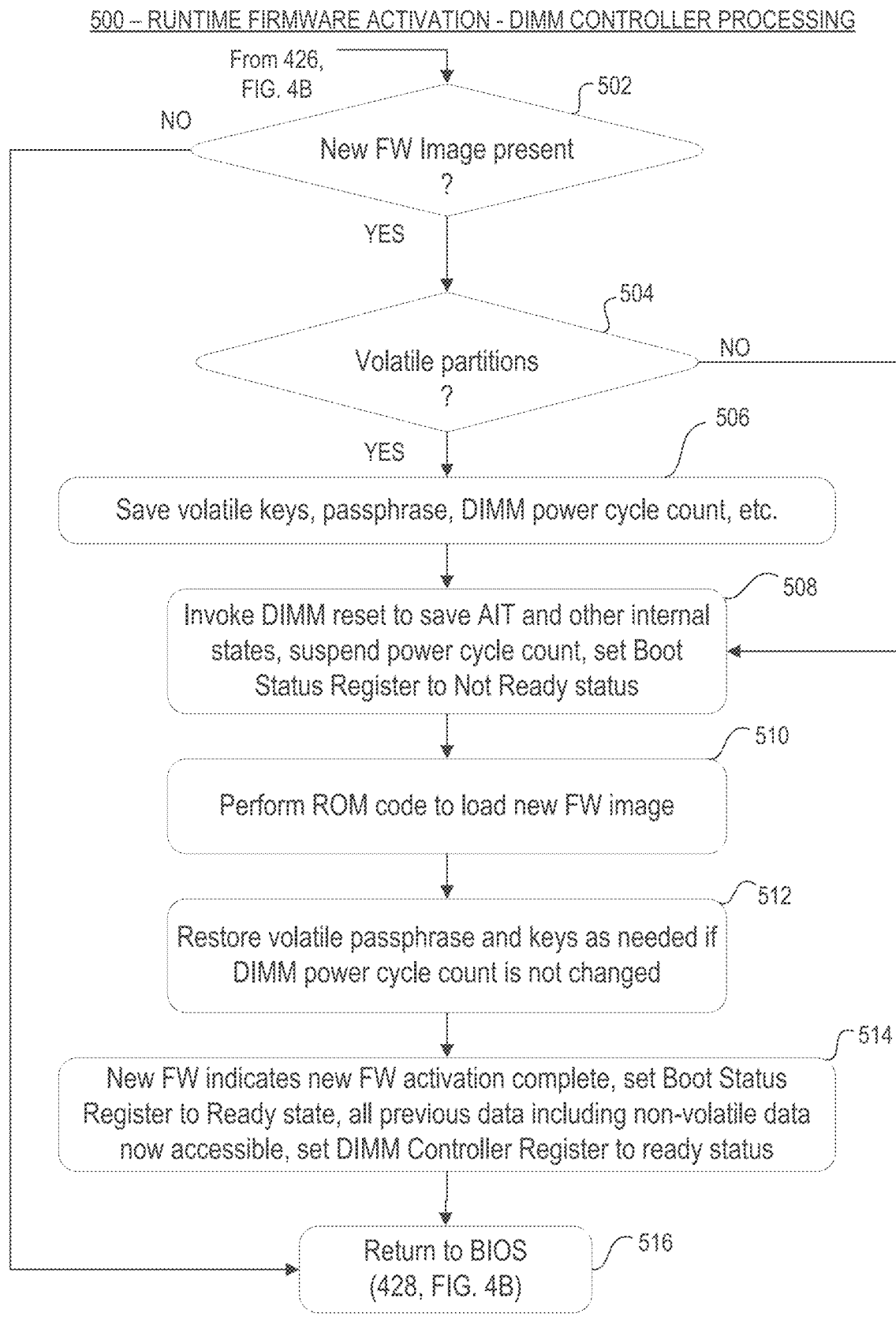
FIG. 5 is a flow diagram of a process flow for a persistent memory module controller providing runtime firmware activation for memory devices in accordance with various examples described herein.

FIG. 5 is a flow diagram of a process flow for a persistent memory module controller providing runtime firmware activation for memory devices in accordance with various examples described herein. Upon receiving a call to the persistent memory module controller's mailbox via the RFA interface to begin the firmware activation on the persistent memory module in which a new firmware image has been stored, the process 500 first confirms, at 502, that the new firmware image is indeed available. If so, then the process 500 further determines, at 504, whether the memory devices in the persistent memory module are in volatile partitions. If so, then the process 500 proceeds, at 506, to save any volatile data in advance of updating the firmware, including any volatile keys, passphrases and the persistent memory module's power cycle count and the like. At 508, the process 500 invokes the persistent memory module's reset process to save the AIT and other internal states of the persistent memory module controller, suspends the memory module's power cycle count and sets the boot status register for communicating the status of the RFA of the new firmware to a "not ready" status. At 510, the process 500 is now ready to perform the read only memory (ROM) microcode to load the stored new firmware image in the persistent memory module controller to replace the current firmware. At 512, the process 500 restores the volatile data, including the volatile passphrase and keys as needed if the persistent memory module's power cycle count has not changed. Finally, at 514, the new firmware issues an indication that the RFA of the new firmware is complete and updates the boot status register to a "ready" status. At this point, all previous data, including the non-volatile data, is now accessible, and the persistent memory module controller sets its register to a "ready" status as well, returning control, at 516, to the BIOS logic from which the call to begin the firmware activation on the persistent memory module was initially received (to FIG. 4B, 428).

Figure 6:
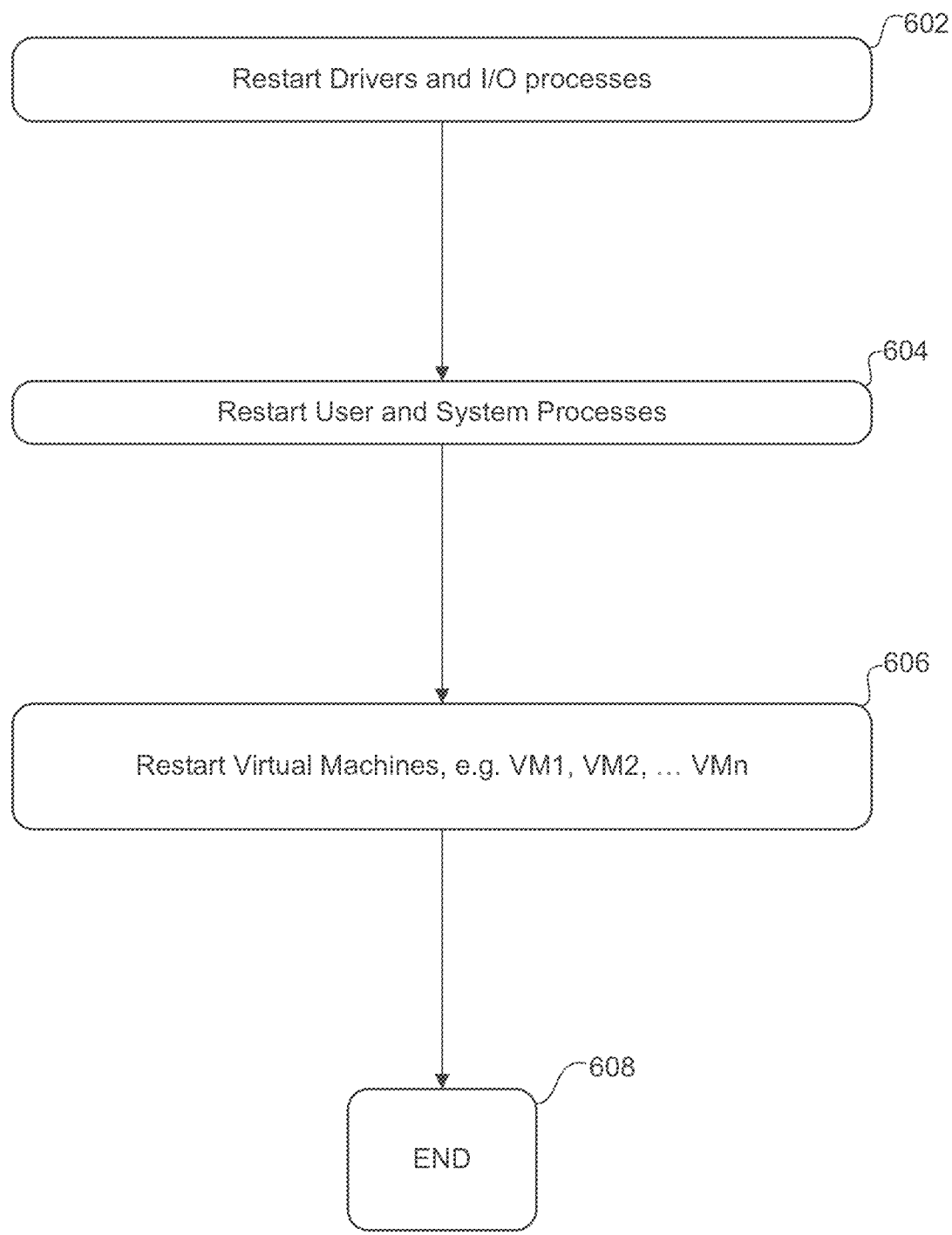
FIG. 6 is a flow diagram of a post-process flow for providing runtime firmware activation for memory devices in accordance with various examples described herein.

FIG. 6 is a flow diagram of a post-process flow for providing runtime firmware activation for memory devices in accordance with various examples described herein. At 602, upon concluding the RFA processes to activate the new firmware, the post-process 600 restarts any input/output processes and drivers that were suspended for the firmware activation. Likewise, at 604 and 606, any user and system processes, and any virtual machines that were suspended are restarted, and the process 600 concludes at 608.

Figure 7:
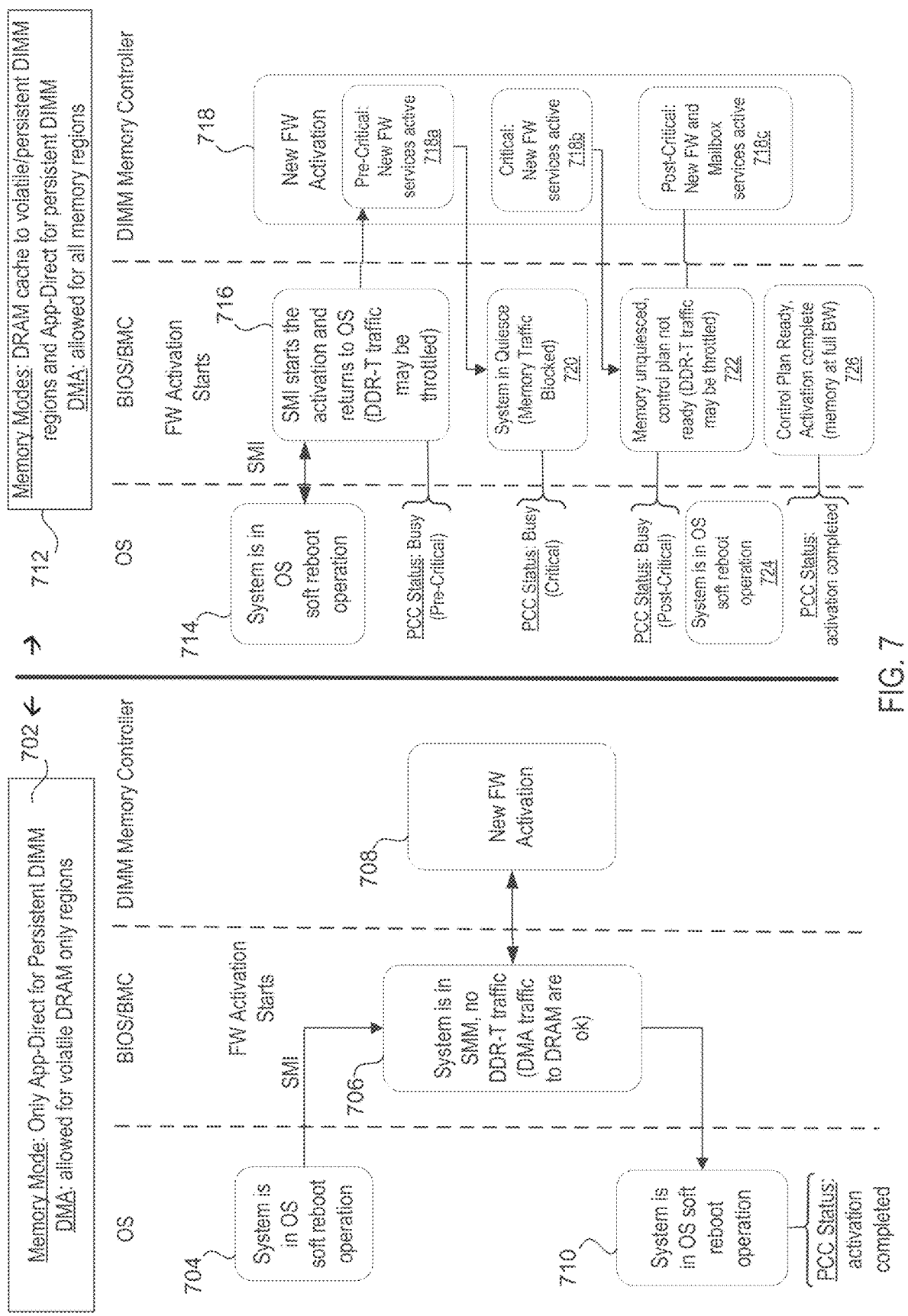
FIG. 7 is a state diagram illustrating runtime firmware activation for memory devices in volatile and non-volatile regions of memory in accordance with various examples described herein.

FIG. 7 is a state diagram illustrating runtime firmware activation for memory devices in volatile and non-volatile regions of memory in accordance with various examples described herein. As described with reference to FIG. 2B and elsewhere, the constraints for performing a successful runtime firmware activation of new firmware differ depending on the operational memory mode of a system and whether to allow direct memory access (DMA) during the runtime firmware activation.

For example, if the current memory mode 702 enables only App-Direct for persistent memory modules, then direct memory access (DMA) is allowed during soft reboot based runtime firmware activation, but only for the volatile DRAM only regions. In this case, the states of the OS, the BIOS baseboard management controller (BMC) and the DIMM Memory Controller as the RFA process unfolds is relatively straightforward. For example, at 704 the OS enters a kernel soft reboot causing an interrupt SMI that starts the firmware activation in the BIOS/BMC. At 706, the system remains in system management mode (SMM) during the new firmware activation 708 taking place in the DIMM memory controller. Traffic to the persistent memory regions is throttled during the new firmware activation, while direct memory access (DMA) to DRAM continues.

However, if the current memory mode 712 enables DRAM cache to both volatile and persistent regions of persistent memory modules, and App-Direct for persistent memory modules, then direct memory access (DMA) is allowed during soft reboot based runtime firmware activation for regions operating in all memory modes. In this case, the states of the OS, BIOS/BMC and DIMM Memory Controller as the RFA process unfolds is more complex. At 714, when the system enters the kernel soft reboot, the SMI starts the RFA process in the BIOS/BMC at 716, throttling the memory interface traffic (e.g., the DDR-T traffic) and returning control back to the OS. In the DIMM memory controller at 718, the new firmware activation proceeds through different states, pre-critical, when the new firmware services are active 718a, critical, when the new firmware services are active 718b and the BIOS/BMC quiesces the system to block memory traffic 720.

In one embodiment, the third and final state of the new firmware activation in the DIMM memory controller is post-critical, when the new firmware and mailbox services of the DIMM memory controller are active 718c and the BIOS/BMC unquiesces memory but the traffic control plan is not yet ready 722. At each stage of the new firmware activation process the status is reflected in the BIOS/PMC in the PCC busy statuses. The PCC busy statuses are used to limit control plane function access to the memory devices during the runtime firmware activation process, particularly those control plane functions that take longer to initialize.

In one embodiment, when the BIOS/BMC traffic control plan is finally ready, then the new firmware activation is considered complete and the memory traffic is restored to full bandwidth 726. The BIOS/BMC updates the PCC status to firmware activation completed and control is returned to the OS which, in turn, exits the kernel soft reboot. The above-described more complex RFA process for a system operating in memory mode 712 allows the RFA process to complete with minimal disruption to the memory traffic.

FIG. 8 is a table illustrating by way of example only and not limitation, selected fields of an ACPI (Advanced Configuration and Power Interface) table 800 for providing kernel soft reboot based runtime firmware activation for memory devices in accordance with various examples described herein. As shown, in one embodiment, the ACPI table of the PCC is used to carry out the RFA interface 104, with a number of different fields containing values that control how the RFA process is implemented. For example, an RFAI platform capability 802 indicates whether the platform supports runtime firmware activation, an RFAI communication channel identifier 804 identifies the portion of the PCC used to carry out the RFA interface 104, the RFA command 806 to specify the command codes used during runtime firmware activation, an RFA capability selection 808 to select whether a platform supports runtime firmware activation, and an RFA status indicator 810 to contain the current status of a runtime firmware activation for a memory device on the platform. In one embodiment the ACPI table include parameter blocks 812 to contain input parameters 812a and output parameters 812b for an RFA command 806.

FIG. 9 is a definition, by way of example only and not limitation, of UEFI (Unified Extensible Firmware Interface) variables for providing sleep state based runtime firmware activation for memory devices in accordance with various examples described herein. For example, the UEFI variables defined in non-volatile random access memory (NVRAM) can include three types of variables for implementing runtime firmware activation during an OS sleep state, including a RuntimeFirmwareActivationCapability, RuntimeFirmwareActivationRequest, and RuntimeFirmwareActivationStatus variables. The UEFI variables function as sleep state system qualifiers that alter the normal sleep state processes that would normally occur when the sleep state is triggered. For example, the RuntimeFirmwareActivationCapability, RuntimeFirmwareActivationRequest variables are sleep state qualifiers that, when set, cause the sleep state process to activate firmware for a memory device and resume normal operation without waiting for a wake event.

Figure 10:
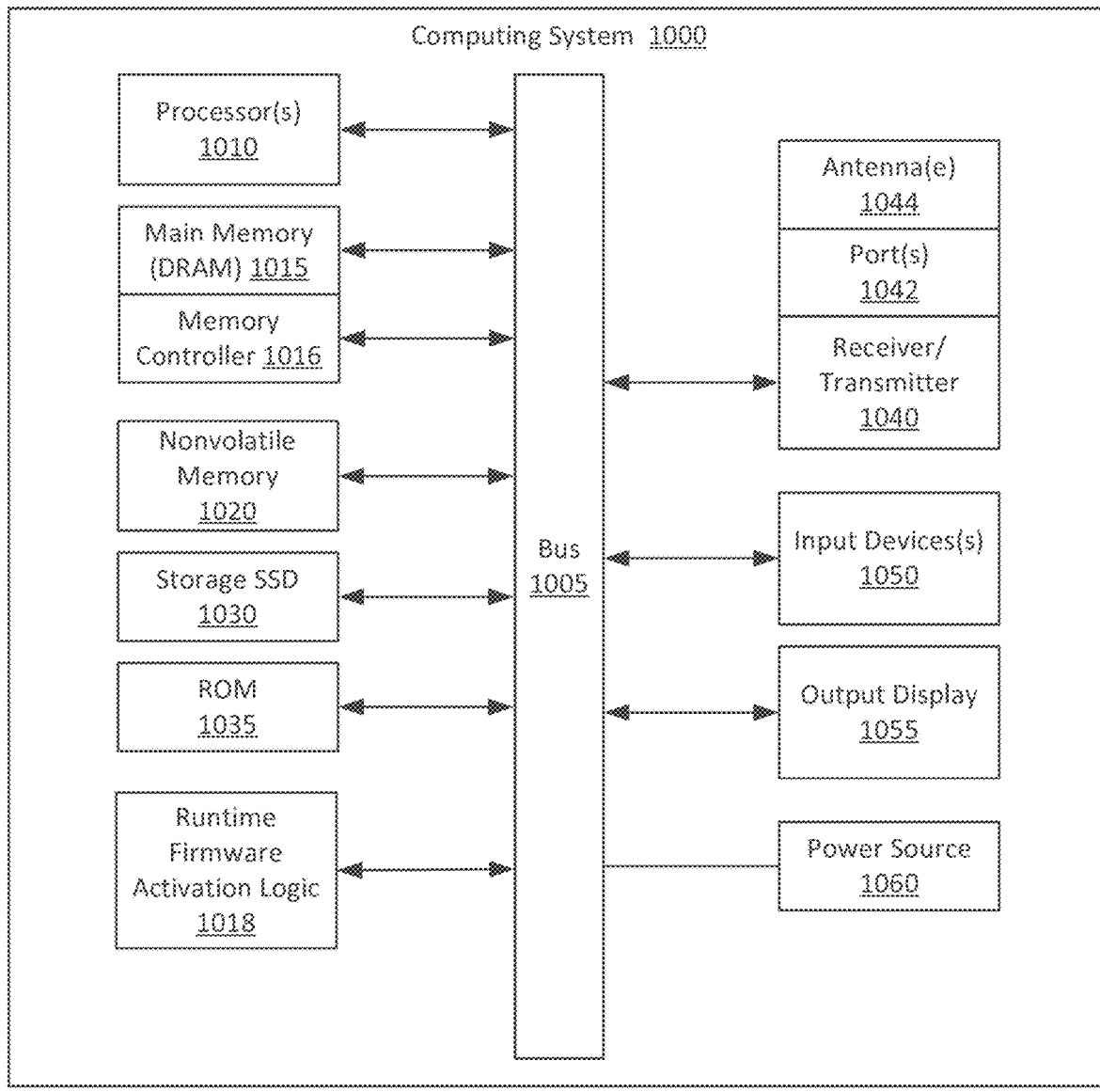
FIG. 10 is a schematic block diagram of a computing system in which runtime firmware activation for memory devices in accordance with various examples described herein can be implemented.

FIG. 10 is an illustration of a computer system 1000 in which runtime firmware activation for memory devices can be implemented in accordance with various examples described herein. In this illustration, certain standard and well-known components that are not germane to the present description are not shown. Elements shown as separate elements may be combined, including, for example, a SoC (System on Chip) combining multiple elements on a single chip, where the single chip is an integrated circuit die.

Computer system 1000 represents a computing device in accordance with any embodiment described herein, such as a storage system or server computer operating in a data center, a laptop computer or a desktop computer. In one embodiment, computer system 1000 could also represent a computing device for a gaming or entertainment control system, a scanner, copier, printer, routing or switching device, embedded computing device, or other type of electronic device.

In some embodiments, computer system 1000 may include a processing means such as one or more processors 1010 which provides processing, operation management, and execution of instructions for computer system 1000. Processors 1010 are coupled to one or more buses or interconnects, shown in general as bus 1005. The processors 1010 may comprise one or more physical processors and one or more logical processors. In some embodiments, the processors may include one or more general-purpose processors or special-purpose processors, or a combination of processors. For example, processors 1010 can include any type of microprocessor, central processing unit (CPU), graphics processing unit (GPU), processing core, or other processing hardware to provide processing for computer system 1000. Processors 1010 control the overall operation of system 1000 and can be or include one or more programmable general-purpose or special-purpose microprocessors, digital signal processors (DSPs), programmable controllers, application specific integrated circuits (ASICs), programmable logic devices (PLDs), or the like, or a combination of such devices.

The bus 1005 is a communication means for transmission of data. The bus 1005 is illustrated as a single bus for simplicity but may represent multiple different interconnects or buses and the component connections to such interconnects or buses may vary. The bus 1005 shown in FIG. 10 is an abstraction that represents any one or more separate physical buses, point-to-point connections, or both connected by appropriate bridges, adapters, or controllers.

In some embodiments, the computer system 1000 further comprises a random access memory (RAM) or other dynamic storage device or element as a main memory 1015 and a memory controller 1016 for storing information and instructions to be executed by the processors 1010. The term "memory" as used herein is intended to encompass all volatile storage media, such as dynamic random access memory (DRAM) and static RAM (SRAM) or other types of memory described elsewhere in this application.

In one embodiment, main memory 1015 of computer system 1000 provides storage for code to be executed by processor 1010, or data values to be used in executing a routine. The computer system 1000 also may comprise a non-volatile memory 1020; a storage device such as a solid-state drive (SSD) 1030 and a read only memory (ROM) 1035 or other static storage device for storing static information and instructions for the processors 1010, a flash memory, one or more varieties of random access memory (RAM), or other memory devices, or a combination of such devices.

In one embodiment, memory controller 1016 can generate and issue commands to memory devices, including non-volatile memory 1020, SSD 1030 and ROM 1035. It will be understood that memory controller 1016 could be a physical part of processors 1010 or a physical part of an interface of bus 1005. For example, memory controller 1016 can be an integrated memory controller, integrated onto a circuit with processors 1010.

Computer system 1000 includes runtime firmware activation logic 1018 configured to cause processors 1010 to activate firmware for persistent memory enabled platforms as described herein with reference to FIGS. 1-9 in cooperation with main memory 1015, memory controller 1016.

Memory devices can include memory devices having memory cell arrays. Non-volatile memory 1020 and SSD 1030 can include a non-volatile memory (NVM) device containing memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place 3D cross-point memory device, or other byte addressable write-in-place NVM devices (also referred to as persistent memory), such as single or multi-level phase change memory or phase change memory with a switch, NVM devices that use chalcogenide phase change material (for example, chalcogenide glass), other types of resistive memory including metal oxide base, oxygen vacancy base and conductive bridge random access memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a domain wall and spin orbit transfer based device, a thyristor based memory device, or a combination of any of the above, or other types of memory.

In some embodiments, the computer system 1000 includes one or more transmitters or receivers 1040 coupled to the bus 1005. In some embodiments, the computer system 1000 may include one or more antennae 1044, such as dipole or monopole antennae, for the transmission and reception of data via wireless communication using a wireless transmitter, receiver, or both, and one or more ports 1042 for the transmission and reception of data via wired communications. Wireless communication includes, but is not limited to, Wi-Fi, Bluetooth™ near field communication, and other wireless communication standards.

In some embodiments, computer system 1000 includes one or more input devices 1050 for the input of data, including hard and soft buttons, a joy stick, a mouse or other pointing device, a keyboard, voice command system, or gesture recognition system.

In some embodiments, computer system 1000 includes an output display 1055, where the output display 1055 may include a liquid crystal display (LCD), or any other display technology, for displaying information or content to a user. In some environments, the output display 1055 may include a touch-screen that is also utilized as at least a part of an input device 1050. Output display 1055 may further include audio output, including one or more speakers, audio output jacks, or other audio, and other output to the user.

The computer system 1000 may also comprise a battery or other power source 1060, which may include a solar cell, a fuel cell, a charged capacitor, near field inductive coupling, or other system or device for providing or generating power in the computer system 1000. The power provided by the power source 1060 may be distributed as required to elements of the computer system 1000.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as non-volatile memory 1020, storage SSD 1030 and ROM 1035, or a combination of such memories, and each of these memories is a form of a machine-readable tangible storage medium. For example, computer-executable instructions can be stored on non-volatile storage devices, such as magnetic hard disk, an optical disk, and are typically written, by a direct memory access process, into memory, such as main memory 1015 during execution of software by a memory controller 1016 and processor 1010. One of skill in the art will immediately recognize that the term machine-readable tangible storage medium includes any type of volatile or non-volatile storage device that is accessible by a processor 1010.

Hardwired circuitry could be used in combination with software instructions to implement the various embodiments. For example, aspects of the described embodiments can be implemented as software and/or firmware installed and stored in a persistent storage device, which can be loaded in a main memory 1015 or other memory and executed by a processor 1010 to carry out the processes or operations described throughout this application. Alternatively, the described embodiments can be implemented at least in part as executable code, or firmware, programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware and/or firmware logic in a processor or processor core as part of an instruction set accessible by a software component via one or more specific instructions.

The description of the foregoing computer system 1000 is not limited to any specific combination of hardware circuitry, firmware and/or software or to any particular source for the instructions executed therein. All or a portion of the described embodiments can be implemented with logic circuitry, such as the above-described ASIC, DSP or FPGA circuitry, including a dedicated logic circuit, controller or microcontroller, or other form of processing core that executes program code instructions. Processes taught by the described embodiments could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g.

"logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Numerous specific details of the above-described embodiments provide a thorough explanation of the methods, media, apparatus, processes and systems for runtime firmware activation for a memory device. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

Additional example implementations are as follows:

An example method, system, apparatus or computer-readable medium can be implemented in a platform and a logic to enable a persistent memory module to activate a new firmware at runtime without restarting an operating system (OS) on the platform, the new firmware to update a current firmware of the persistent memory module.

In another example implementation, to enable the persistent memory module to activate the new firmware at runtime without restarting the OS, the logic is to instruct a BIOS to provide the OS with runtime services to activate the new firmware in connection with any one or more of a sleep state and a soft reboot of the OS, the OS including any of a Windows OS and a Linux OS.

In another example implementation, the persistent memory module includes any of a non-volatile dual inline memory module (NVDIMM) and a three-dimensional crosspoint (3D XP) DIMM, and to enable the persistent memory module to activate the new firmware at runtime without restarting the OS, the logic is to enable the OS to instruct the persistent memory module to store a firmware image of the new firmware and instruct the persistent memory module to activate the new firmware from the firmware image.

In another example implementation, to instruct the persistent memory module to store the firmware image of the new firmware, the logic is to perform a method of an Advanced Configuration Power Interface (ACPI) to the platform, the method specific to the persistent memory module.

In another example implementation, the logic is to enable the OS to obtain a status of the new firmware, the status including any of a failure and a success of the persistent memory module to activate the new firmware.

In another example implementation, the logic is to enable the OS to set, via a Unified Extensible Firmware Interface (UEFI) to the platform, a variable to instruct the persistent memory module to activate the new firmware upon the OS having entered the sleep state.

In another example implementation, the variable set in the UEFI includes any one or more variables for an RFA request to instruct the persistent memory module to activate the new firmware, an RFA capability of the persistent memory module, and a status of the RFA request.

In another example implementation, the logic is to enable the OS to publish, via an Advanced Configuration Power Interface (ACPI) to the platform, a request to instruct the persistent memory module to activate the new firmware during the soft reboot of the OS.

In another example implementation, to enable the OS to publish the request to instruct the persistent memory module to activate the new firmware during the soft reboot of the OS, the logic is to enable the OS to access any one or more of an identifier of a communication channel in the ACPI where the request is published an indicator of a capability of the persistent memory module to activate firmware at runtime a status of the request, and a command to carry out the request.

In another example implementation, to enable the persistent memory module to activate the new firmware without restarting the OS, the logic is to enable the OS to preserve a state of a virtual machine operated by the OS, shutdown any one or more processes operating on the platform including any user processes and system processes, and shutdown any drivers and input/output systems operating on the platform.

In another example implementation, to enable the persistent memory module to activate the new firmware without restarting the OS, the logic is to enable the OS to determine whether the persistent memory module successfully activates the new firmware, restore a virtual machine operated by the OS to a state before the OS instructs the persistent memory module to activate the new firmware, restart any one or more processes active before the OS instructs the persistent memory module to activate the new firmware, the one or more processes including any user processes and system processes, and restart any drivers and input/output systems active before the OS instructs the persistent memory module to activate the new firmware.

In another example implementation, the OS operates in one or more memory modes, including a memory mode to enable a volatile partition of memory, and the logic is to enable the persistent memory module to determine that the volatile partition of memory is enabled, preserve volatile data in the persistent memory module, the volatile data including any one or more of a volatile key, a passphrase, an address indirection table and a power cycle count, reset the persistent memory module to activate the new firmware, and restore the volatile data in the persistent memory module after the new firmware is activated.

An example method, system, apparatus or computer-readable medium can be implemented in a persistent memory module comprising one or more memory devices, a controller to control the one or more memory devices, the controller including a current firmware, and the controller to update the current firmware with a new firmware responsive to an instruction from a platform to activate the new firmware during any one of a sleep state and a soft reboot of an operating system (OS) operating the platform.

In another example implementation, the one or more memory devices include a non-volatile (NV) memory device, the NV memory device including a three-dimensional (3D) cross-point (XP) memory, and the controller and the one or more memory devices comprise any of a NV dual inline memory module (DIMM) and 3DXP DIMM.

In another example implementation, a mailbox in the controller is to receive the instruction from the platform, and the controller is to invoke a reset process responsive to receipt of the instruction, the reset process to determine that the new firmware is eligible to update the current firmware in the controller, determine the one or more memory devices includes a persistent memory device in a volatile region of memory for the platform, save a volatile data associated with the volatile region of memory, and restore the volatile data associated with the volatile region of memory upon completion of the reset process.

In another example implementation, the volatile data includes any one or more of a passphrase for the volatile region of memory, a persistent key and a power cycle count of the controller.

In another example implementation, the reset process is further to save an internal state of the controller, suspend a power cycle count, load the new firmware to replace the current firmware, set a status bit in a register of the controller to indicate that the new firmware has been activated, restore the internal state of the controller, and resume the power cycle count.

In another example implementation, a flash memory is to store an image of the new firmware responsive to a method of an Advanced Configuration Power Interface (ACPI) to the platform, and to load the new firmware to replace the current firmware is to load the new firmware from the image of the new firmware stored in the flash memory.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. An apparatus comprising:
    a platform;
    a logic to enable a persistent memory module to activate a new firmware at runtime without restarting an operating system (OS) on the platform, the new firmware to update a current firmware of the persistent memory module;
    the logic to enable the OS to instruct a Basic Input/Output System (BIOS) to provide the OS with runtime services to activate the new firmware in connection with any one or more of a sleep state and a soft reboot of the OS; and
    wherein:
        the logic to instruct the BIOS is to enable the OS to publish, via an Advanced Configuration Power Interface (ACPI) to the platform, a request to instruct the persistent memory module to activate the new firmware during the soft reboot of the OS, and
        the OS including any of a Windows OS and a Linux OS.
2. The apparatus of claim 1, wherein:
    the persistent memory module includes any of a non-volatile dual inline memory module (NVDIMM) and a three-dimensional cross-point (3D XP) DIMM; and
    to enable the persistent memory module to activate the new firmware at runtime without restarting the OS, the runtime services provided to the OS include to:
    instruct the persistent memory module to store a firmware image of the new firmware, and
    instruct the persistent memory module to activate the new firmware from the firmware image.
3. The apparatus of claim 2, wherein to instruct the persistent memory module to store the firmware image of the new firmware includes to perform a method of an

Advanced Configuration Power Interface (ACPI) to the platform, the method specific to the persistent memory module.

4. The apparatus of claim 1, wherein the runtime services provided to the OS include to obtain a status of the new firmware, the status including any of a failure and a success of the persistent memory module to activate the new firmware.

5. The apparatus of claim 1, wherein the logic to instruct the BIOS is to enable the OS to set, via a Unified Extensible Firmware Interface (UEFI) to the platform, a variable to instruct the persistent memory module to activate the new firmware upon the OS having entered the sleep state.

6. The apparatus of claim 5, wherein the variable set in the UEFI includes any one or more variables for:
    an RFA request to instruct the persistent memory module to activate the new firmware;
    an RFA capability of the persistent memory module; and
    a status of the RFA request.

7. The apparatus of claim 1, wherein to enable the OS to publish the request to instruct the persistent memory module to activate the new firmware during the soft reboot of the OS, the logic to instruct the BIOS is to enable the OS to access any one or more of:
    an identifier of a communication channel in the ACPI where the request is published;
    an indicator of a capability of the persistent memory module to activate firmware at runtime;
    a status of the request; and
    a command to carry out the request.

8. The apparatus of claim 1, wherein the runtime services provided to the OS include to:
    preserve a state of a virtual machine operated by the OS;
    shutdown any one or more processes operating on the platform including any user processes and system processes; and
    shutdown any drivers and input/output systems operating on the platform.

9. The apparatus of claim 8, wherein the runtime services provided to the OS further include to:
    before instructing the persistent memory module to activate the new firmware, to:
        restore the state of the virtual machine operated by the OS to a preserved state,
        restart any one or more shutdown processes, and
        restart any shutdown drivers and shutdown input/output systems;
    instruct the persistent memory module to activate the new firmware; and
    determine whether the persistent memory module successfully activated the new firmware.

10. The apparatus of claim 1 wherein:
    the OS operates in one or more memory modes, including a memory mode to enable a volatile partition of memory; and
    the runtime services provided to the OS include to instruct the persistent memory module to:
        determine that the volatile partition of memory is enabled,
        preserve volatile data in the persistent memory module, the volatile data including any one or more of a volatile key, a passphrase, an address indirection table and a power cycle count,
        reset the persistent memory module to activate the new firmware, and
        restore the volatile data in the persistent memory module after the new firmware is activated.

11. A persistent memory module, comprising:
    one or more memory devices;
    a controller to control the one or more memory devices, the controller including a current firmware;
    the controller to update the current firmware with a new firmware responsive to an instruction from a basic input/output system (BIOS) providing runtime services to an operating system (OS) operating a platform to activate the new firmware during any one of a sleep state and a soft reboot of the OS operating the platform;
    a mailbox in the controller, the mailbox to receive the instruction from the BIOS providing the runtime services to the platform; and
    the controller to invoke a reset process responsive to receipt of the instruction, the reset process to:
        determine that the new firmware is eligible to update the current firmware in the controller,
        determine the one or more memory devices includes a persistent memory device in a volatile region of memory for the platform,
        save a volatile data associated with the volatile region of memory, and
        restore the volatile data associated with the volatile region of memory upon completion of the reset process.

12. The persistent memory module of claim 11 wherein:
    the one or more memory devices include a non-volatile (NV) memory device, the NV memory device including a three-dimensional (3D) cross-point (XP) memory; and
    the controller and the one or more memory devices comprise any of a NV dual inline memory module (DIMM) and 3DXP DIMM.

13. The persistent memory module of claim 11, wherein the volatile data includes any one or more of a passphrase for the volatile region of memory, a persistent key and a power cycle count of the controller.

14. The persistent memory module of claim 11, the reset process further to:
    save an internal state of the controller;
    suspend a power cycle count;
    load the new firmware to replace the current firmware;
    set a status bit in a register of the controller to indicate that the new firmware has been activated;
    restore the internal state of the controller; and
    resume the power cycle count.

15. The persistent memory module of claim 14, further comprising:
    a flash memory to store an image of the new firmware responsive to a method of an Advanced Configuration Power Interface (ACPI) to the platform; and
        wherein to load the new firmware to replace the current firmware is to load the new firmware from the image of the new firmware stored in the flash memory.

16. A system comprising:
    a platform;
    a platform control hub (PCH) coupled to the platform, the PCH having an interface to enable an operating system (OS) on the platform to activate a new firmware in a persistent memory module at runtime without restarting the OS;
    wherein the interface includes a basic input/output system (BIOS) to provide runtime services to activate the new firmware in connection with any one or more of a sleep state and a soft reboot of the OS, the OS including any of a Windows OS and a Linux OS; and
    wherein the interface further includes a logic to instruct the BIOS to enable the OS to publish, via an Advanced Configuration Power Interface (ACPI) to the PCH, a request to instruct the persistent memory module to activate the new firmware during the soft reboot of the OS.

17. The system of claim 16, wherein the persistent memory module includes any of a non-volatile dual inline memory module (NVDIMM) and a three-dimensional cross-point (3D XP) DIMM, the runtime services to:
  instruct the persistent memory module to store a firmware image of the new firmware; and
  in connection with operating during any one or more of the sleep state and the soft reboot of the OS, instruct the persistent memory module to activate the new firmware from the firmware image.

18. A memory device circuitry, comprising:
  a controller coupled to one or more memory devices;
  a firmware to configure the controller to control the one or more memory devices;
  the controller to update the firmware with a new firmware responsive to an instruction from a basic input/output system (BIOS) providing runtime services to an operating system (OS) operating a platform to activate the new firmware during any one of a sleep state and a soft reboot of the OS operating the platform;
  a register in the controller, the register configured to receive the instruction from the BIOS providing the runtime services to the platform; and
  the controller to trigger a reset process responsive to receipt of the instruction, the reset process to:
    determine that the new firmware is eligible to update the firmware in the controller,
    determine that any of the one or more memory devices is in a volatile partition of memory in the platform,
    save a volatile data associated with the volatile partition of memory, and
    restore the volatile data associated with the volatile partition of memory upon completion of the reset process.

19. The memory device circuitry of claim 18 wherein:
  the one or more memory devices include a non-volatile (NV) memory device, the NV memory device including a three-dimensional (3D) cross-point (XP) memory; and
    the controller and the one or more memory devices comprise any of a NV dual inline memory module (DIMM) and 3DXP DIMM.

20. The memory device circuitry of claim 18, wherein:
  the volatile data includes any one or more of a passphrase for the volatile partition of memory, a persistent key and a power cycle count of the controller; and
  the reset process further to:
    save an internal state of the controller,
    suspend a power cycle count,
    load the new firmware to replace the firmware,
    set a status bit in a second register of the controller, the second register to indicate whether the new firmware is activated,
    restore the internal state of the controller, and
    resume the power cycle count.

* * * * *